(12) United States Patent
Lai

(10) Patent No.: US 6,188,411 B1
(45) Date of Patent: Feb. 13, 2001

(54) CLOSED-LOOP READING OF INDEX REGISTERS USING WIDE READ AND NARROW WRITE FOR MULTI-THREADED SYSTEM

(75) Inventor: Michael Man Lok Lai, Fremont, CA (US)

(73) Assignee: NeoMagic Corp., Santa Clara, CA (US)

( * ) Notice: Under 35 U.S.C. 154(b), the term of this patent shall be extended for 0 days.

(21) Appl. No.: 09/108,789

(22) Filed: Jul. 2, 1998

(51) Int. Cl.$^7$ ................................................ G09G 5/00
(52) U.S. Cl. ........................ 345/513; 345/516; 709/107
(58) Field of Search .................................. 345/501, 503, 345/520, 513, 198, 516; 709/107, 108; 712/228, 229, 248

(56) References Cited

U.S. PATENT DOCUMENTS

| | | | |
|---|---|---|---|
| 4,313,200 | 1/1982 | Nishiura | 714/736 |
| 5,142,668 | 8/1992 | Priem et al. | 345/434 |
| 5,159,686 | 10/1992 | Chastain et al. | 709/105 |
| 5,276,833 | 1/1994 | Auvinen et al. | 711/105 |
| 5,357,617 * | 10/1994 | Davis et al. | 712/245 |
| 5,394,519 | 2/1995 | Bodin | 345/431 |
| 5,434,986 | 7/1995 | Kuslak et al. | 712/216 |
| 5,446,859 | 8/1995 | Shin et al. | 711/100 |
| 5,586,318 | 12/1996 | Toutonghi | 709/107 |
| 5,655,132 * | 8/1997 | Watson | 709/104 |
| 5,666,546 * | 9/1997 | Donnan | 709/213 |
| 5,682,531 * | 10/1997 | Nakamura | 709/108 |
| 5,724,529 | 3/1998 | Smith et al. | 710/129 |
| 5,742,841 | 4/1998 | DeRoo | 712/43 |
| 5,926,187 * | 7/1999 | Kim | 345/435 |
| 5,966,515 * | 10/1999 | Alferness | 395/500 |
| 5,996,068 * | 11/1999 | Dwyer, III et al. | 712/228 |
| 6,009,476 * | 12/1999 | Flory et al. | 709/301 |

OTHER PUBLICATIONS

Golla, P. and Lin, E., "A Dynamic Scheduling Logic for Exploiting Multiple Functional Units in Single Chip Multi-threaded Architectures", Proceedings of the 1999 ACM Symposium on Applied Computing, 1999, pp. 466–473.*

* cited by examiner

*Primary Examiner*—Ulka J. Chauhan
(74) *Attorney, Agent, or Firm*—Stuart T. Auvinen

(57) ABSTRACT

Indexed registers in controller chips are read in a two-step process. First, an 8-bit write instruction writes an index into an index register in the controller chip. Secondly, a 16-bit read instruction reads both the index register and a data register selected by the index from the index register. When index registers are read in a multi-threaded system, programs in two different threads could access the same index register, each writing a different index into the index register. When another thread over-writes an index written by a current thread, the wrong index and the wrong data are read by the current thread. The current thread detects that the index was overwritten by another thread by extracting the index from the 16-bit read and comparing it to the desired index. When the extracted index mis-matches, the current thread retries, again writing the index and reading back both the index and data. Additional slow I/O operations are only needed when both threads access the same index register, when the wrong data and index are read. The 16-bit read provides closed-loop feedback to the software reading the index register.

20 Claims, 7 Drawing Sheets

OUTPUT_8(INDX_REG,INDX1)
INDXDATA1=INPUT_16(INDX_REG)
FIG. 7
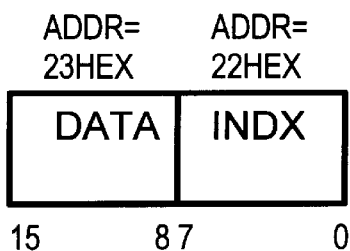
FIG. 8
```
DO
{
    OUTPUT_8(INDX_REG,INDX)
    INDXDATA=INPUT_16(INDX_REG)
} WHILE
    ((INDXDATA & 0xFF) != INDX)
```
FIG. 10
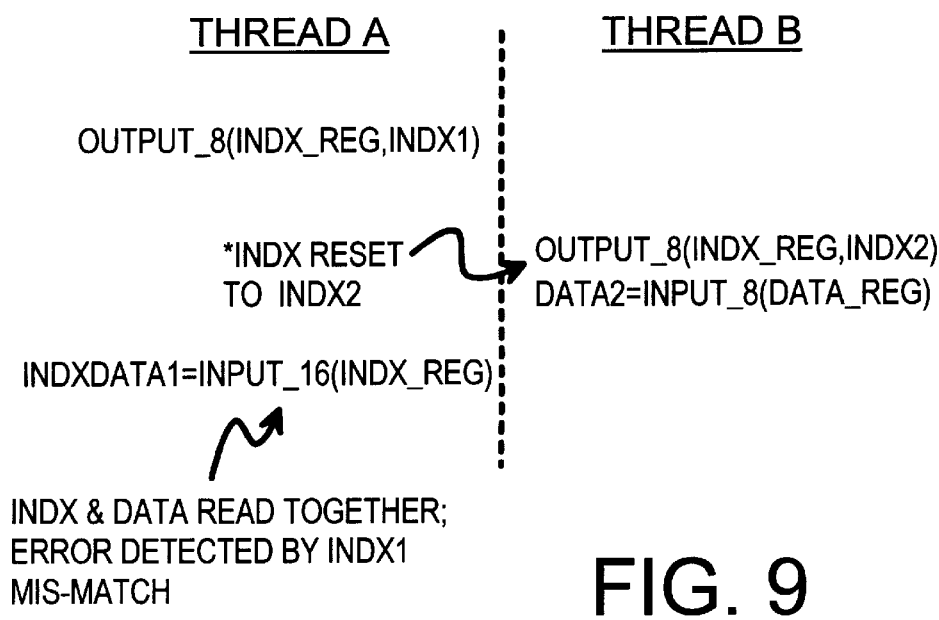
FIG. 9

CLOSED-LOOP READING OF INDEX REGISTERS USING WIDE READ AND NARROW WRITE FOR MULTI-THREADED SYSTEM

FIELD OF THE INVENTION

This invention relates to computer systems, and more particularly to addressing methods for indexed registers in computer chips.

BACKGROUND OF THE INVENTION

Computer systems such as personal computers (PCs) have a variety of controller integrated circuits (ICs) or chips. These controller chips control subsystems such as for graphics, the keyboard, hard, floppy, and optical disks, and general system logic such as memory bus. Controller chips are continually being improved to increase the performance and feature sets of computer subsystems.

Controller chips are often programmable. For example, the graphics controller can be programmed with the display resolution, such as the number of pixels in a horizontal line, or the number of lines on a screen. Memory-controller chips can be programmed with numbers of clock cycles for memory accesses, so that the timing signals generated by the controller chip can be adjusted for faster memory chips or faster bus clocks.

When the computer is initialized or booted, lower-level software such as the BIOS or graphics drivers can program the controller chips by writing values into programmable registers on the controller chips. Users or higher-level programs can adjust features such as resolutions by writing different values to these registers. For example, a video game can change the resolution and color depth by writing to resolution registers in the graphics controller chip when the game program is started.

The microprocessor's address space is typically partitioned into memory and input/output (I/O) address spaces. While a large memory address space such as 4 GigaBytes (32 address bits) is provided, the I/O address space is typically much smaller, perhaps only 64 Kbytes (16 address bits). I/O addresses are used for accessing peripheral devices such as I/O ports, disk drives, modems, mouse and keyboard, and the controller chips. Often certain ranges of I/O addresses are reserved for certain types of peripherals, such as graphics, disks, and parallel ports. Thus the number of I/O addresses available to a peripheral controller chips is often limited.

As new features are added to a controller chip, additional registers are needed to control these features. The number of registers needed can quickly exceed the number of discrete addresses in the peripheral's I/O range. I/O addresses are often shared among many registers by using an indexing scheme.

Many registers on a controller chip can be accessed through a pair of I/O addresses using an index register. Registers are accessed in a two-step process. First the microprocessor writes the register's index into a first I/O address, the index register. The controller chip reads the register's index and then couples that register to the chip's input and output. In the second cycle, the microprocessor reads or writes a second I/O address, the data register. The data read or written to the data register is coupled to the register selected by the index written in the first cycle. Other registers on the controller chip can be read or written by writing a different value for the index in the first cycle.

Each access of an indexed register on the controller chip thus takes two cycles rather than just one. First the index is written, then the register identified by the index is accessed. While this slows performance, often the index registers are only infrequently used and thus overall system performance is not hampered. Some registers that are more-frequently accessed can be assigned their own I/O addresses, while other less-frequently-accessed registers can be indexed, sharing the index and data I/O addresses.

Indexed Registers—FIG. 1

FIG. 1 shows a computer system with a controller chip having indexed registers. A central processing unit (CPU) 12 is a microprocessor that executes instructions in a program stored in memory 14 or in a BIOS ROM (not shown). Display 16 is controlled by graphics controller 10. Programs executing on CPU 12 can update the information shown on display 16 by writing to a frame buffer inside or controlled by graphics controller 10. Graphics controller 10 reads lines of pixels from the frame buffer and transfers them to display 16, which can be a cathode-ray tube (CRT) monitor or a flat-panel display. Bus 11 connects CPU 12 and graphics controller 10, and includes an address bus and a data bus. Bus 11 may be divided into separate sections by buffer chips.

Graphics controller 10 includes indexed registers 20 that control various features. For example, power-saving modes, display characteristics, timing, and shading can be controlled by CPU 12 writing to indexed registers 20.

FIG. 2 highlights an index register that selects a data register for access. During a first access cycle, the CPU writes an index to index register 32. This index is decoded by selector 34, which selects one of the registers in indexed register 20 for access. The other indexed registers are deselected and cannot be accessed until a new index is written to index register 32.

In the second CPU access cycle, the CPU writes a data value to a second I/O address. The data written by the CPU is written through selector 34 to the register in indexed registers 20 that was selected by the index in index register 32. The CPU may also read the selected register rather than write the selected register since selector 34 provides a bi-directional data path, depending on the read/write control signal from the CPU.

The values written to indexed registers 20 are used to control features of the controller chip. For example, indexed registers 20 can output a number of pixels per horizontal line, and a number of lines in a screen, to counters 38 in a graphics controller. When the number of pixels written to the display matches the value of pixels/line from indexed registers 20, then a horizontal sync HSYNC pulse is generated. When the number of lines counted matches the total number of lines from indexed registers 20, then the vertical sync VSYNC is generated. Controls for windows within a screen can likewise come from indexed registers 20, such as for a movie window as described in "Transparent Blocking of CRT Refresh Fetches During Video Overlay Using Dummy Fetches", U.S. Pat. No. 5,754,170 by Ranganathan et al., and assigned to NeoMagic Corp.

FIG. 3 shows an index-register decoder in a controller chip. I/O address or port 22 (hexadecimal, or hex) is used as the index register, while I/O address 23 (hex) is used for the data register. The CPU first writes the index of the desired register to the index register by executing an I/O output instruction with an address of 22 and the index as the data. Comparator 19 detects that the address matches 22, the index register, which is ANDed by gate 17 with a strobe generated by logic 21 when the access cycle is for an I/O address rather than a memory address. In the second access cycle, the CPU writes to the data register's port, address 23. Comparator 18 detects address 23, and outputs a one to AND gate 15. When a strobe is generated by logic 21, AND gate 15 pulses its output REG_ACC, which strobes the data into the selected index register.

FIG. 4 illustrates in an abstract way how an index register and a data register are used to access indexed registers. Index register 32 is accessed when the CPU writes to I/O address 22, while data register 36 is accessed when the CPU accessed I/O address 23. Data register 36 does not have to be a physical register, since it merely appears to the CPU to be an I/O port.

During a first cycle, the CPU executes the output instruction out(indx_reg, indx), which sends the address "indx_reg" (22 hex) out on the address bus, and sends the index "indx" as the data over the data bus. The address "indx_reg" selects index register 32, while the data "indx" is written into index register 32. This index is used to select one of the registers in indexed registers 20 for access, coupling the selected register to data register 36.

In the second access cycle, the CPU writes to data register 36 using the output instruction out(data_greg, data). The address "data_reg" (23 hex) is output on the address bus, while the data "data" is output to the data bus. This data is written into data register 36 and transferred to the selected register in indexed registers 20.

A read rather than a write can be performed in the second cycle using an input instruction. The input instruction in(data_reg) sends the address "data_reg" onto the data bus, which causes data register 36 to be accessed. Control logic detects that the read signal is activated, and so the data from data register 36 is output by the controller chip to the data bus so the data can be read by the CPU. Data is first transferred from the register selected by the index in index register 32 from indexed registers 20 to data register 36.

The indexed register are typically byte-wide (8-bit) registers, with each byte register having a different index. The second access cycle does not have to immediately follow the first access cycle, since the controller-chip index-register-access logic is not affected by memory cycles or I/O cycles to other ports.

Multi-Threaded Operation—FIG. 5

FIG. 5 highlights the problem of index overwriting by multiple threads. Today's more complex PC's use multi-threaded operating systems that can execute two or more programs independent of each other. The threads typically share the same CPU, or can execute on separate CPUs. The relative timing of instructions executed by one program in one thread can vary substantially compared to instructions executed by another thread.

When both threads access the same set of indexed registers, problems can occur. For example, both threads may be accessing graphics registers on a graphics controller chip. The threads could be reading indexed registers to determine what graphics modes and features are currently operating. Even when both threads only read indexed registers, problems can occur since the index must be written before any indexed register can be read.

Thread A reads data from an indexed register at index "indx1", while thread B is reading data from an indexed register at another index, index "indx2". Both threads are writing the index to port "indx_reg" and reading from port "data_reg". Thread A first writes index "indx1" to the index register with instruction output_8(indx_reg, indx1), which is an 8-bit write operation. The next instruction in thread A, its second cycle, reads the data register: instruction data1=input_8(data_reg) which reads the data register and stores it as variable "data1".

Before thread A can execute the second instruction to read the data register, the CPU interrupts thread A and continues execution of thread B. When multiple CPUs are used, the same effect occurs when thread A loses arbitration of the I/O bus to thread B's CPU.

Thread B is at a point where another indexed register is to be read. Thread B first writes the index of the register thread B needs to read, "indx2" to the index register with the instruction output_8(indx_reg, indx2). The new index "indx2" is different from thread A's index "indx1", and thus over-writes the index register with thread B's index. Thread A is not notified by thread B that its index has been erased. Thread B's next instruction, its second cycle, reads the data register: instruction data2=input_8(data_reg). This reads the data register and stores it as variable "data2". Since thread B just wrote its index to the index register, thread B reads the intended register.

When thread A resumes, it executes the second cycle, reading the data register. Instruction data1=input_8(data_reg) reads the data register and stores it as variable "data1". However, the index used is "indx2" that was just written by thread B, not "indx1" that thread A wrote. Thus the data read is actually "data2" from index "indx2", the same data that thread B read. Thread A can later crash since it read the wrong graphics information and may make decisions about the graphics format that are not compatible with the actual graphics mode. Similar problems can occur with systems logic chips, keyboard controllers, and disk controllers.

A solution for writing indexed registers is to always write both registers at the same time, using a 16-bit write cycle. Since the data register is usually the next byte above the index register, a 16-bit write cycle writes both the index and the data at the same time. The instruction: Output_16 (index_reg, (data<<8)+index) shifts the data byte up by 8 bits to the upper byte, while the index occupies the lower byte. While this 16-bit operation is useful for writing data, it is not useful for reading the data. The index must be written while the data is read. A low-level atomic instruction can only read or write, but not both.

Restoring Index Not Always Effective—FIG. 6

FIG. 6 highlights the failure of a common solution for multi-threaded register reading. Each thread can include additional instructions to save the original index from the index register and then restore the original index to the index register after the thread has read another index register Thus the thread restores the original index. This is effective when the thread is not interrupted during the save and restore sequence. However, if the thread is interrupted before it can restore the original index, failures can occur.

Thread A first reads and saves the original index in the index register with the instruction orig_indx=input_8 (indx_reg). Then thread A writes the index of the register it desires to read, "indx1", with an output_8 instruction.

Before thread A can read the data register, thread B executes instructions that read and write the same index register. Thread B stores the original index as orig_indx2, which is the index just written by thread A, "indx1". Then thread B writes the index of the register thread B desires to read, "indx2", with an output_8 instruction.

However, before thread B can read the data register and restore the original index, thread A regains control of the I/O bus and continues execution. Thread A reads the data register with the instruction data1=input_8(data_reg). Unfortunately, the register selected by the controller chip is the indx2 register, not the indx1 register, since the index register currently contains indx2. The desired index, indx1, was over-written by thread B.

When thread A restores the original index, it restores orig_indx1, which was the index before thread B changed the index. When thread B resumes execution, the wrong index is in the index register, because thread B wants to read from index indx2, not from orig_indx1. Thus both thread A and thread B read the wrong index register and the wrong data.

If thread B were allowed to continue and read the data register and restore the original index, then no failure would have occurred since thread A's index would have been restored. However, in a completely arbitrary multi-tasking system, the exact timing of thread A and thread B cannot be guaranteed. Thus, while unlikely, the failure could occur. When both threads are spawned from the same event, such as from execution of a single multi-threaded program, the failure may be repeatable. Otherwise, such a failure can be extremely difficult to detect and capture in a laboratory.

Even when the situation illustrated in FIG. 6 does not occur, the additional saving and restoring of the original index is wasteful. I/O reads and writes of index registers are relatively slow, requiring perhaps hundreds of clock cycles on fast PCs. For example, 10 to 15 PCI cycles are needed for each read or write. For a 33 MHz PCI bus and a 400 MHz CPU, this translates to 360 CPU clock cycles. Thus it is desirable to avoid adding the save and restore instructions.

What is desired is a method to read and write index registers that is immune to multitasking interruption. It is desired to allow multiple threads to simultaneously read and write indexed registers without notifying each other. It is desired to allow threads to read and write indexed registers in a manner that is completely asynchronous to each other. Multi-tasking index-register access is desired that does not unnecessarily add slow index-register read and write operations. Higher-performance index-register accessing for multi-tasking is desired.

SUMMARY OF THE INVENTION

A method for reading indexed registers executes a single-width write instruction in a processor. A desired index value is written to an index register in a controller chip when the single-width write instruction is executed. The desired index value has a single width of bits.

A multiple-width read instruction is executed in the processor. When the multiple-width read instruction is executed a stored index from the index register and selected data from a selected data register are read from the controller chip. The selected data register is identified by the stored index from the index register.

The stored index is compared to the desired index value. The single-width write instruction and the multiple-width read instruction are re-executed when the stored index does not match the desired index value. Thus the stored index is read with the selected data from the selected data register that is selected by the stored index to determine when to re-execute reading the indexed registers.

In further aspects of the invention a second program is executed in a second thread. The second thread over-writes a second index to the index register after the single-width write instruction is executed by a first thread, but before the multiple-width read instruction is executed by the first thread. The first thread reads the second index that mismatches the desired index value when the second thread over-writes the index register. Thus the second thread over-writing the index register is detected by the first thread comparing the stored index to the desired index value.

In further aspects the stored index selects from among the plurality of data registers. The multiple-width read instruction is an atomic instruction performing a single read operation that simultaneously fetches two single-width value in a single access cycle. The selected data register and the index register have sequential addresses.

In still further aspects of the invention the stored index is transferred over a first single-width segment of a data bus connecting the controller chip to the processor when the multiple-width read instruction is executed. The selected data is transferred over a second single-width segment of the data bus connecting the controller chip to the processor when the multiple-width read instruction is executed.

In other aspects the single-width is 8 bits and the multiple-width is 16 bits. The selected data register and the index register are byte-wide registers.

BRIEF DESCRIPTION OF THE DRAWINGS

FIG. 7 highlights that an 8-bit write instruction sets the index, while a 16-bit read instruction simultaneously reads both the data and the index.

FIG. 8 shows the format of the data read by the 16-bit read instruction that reads both the index and the data together.

FIG. 9 illustrates that the 16-bit read can detect when multiple threads overwrite the same index.

FIG. 10 shows a code segment that repeats an 8-bit index write when a 16-bit data read detects an index mismatch.

DETAILED DESCRIPTION

Figure 1:
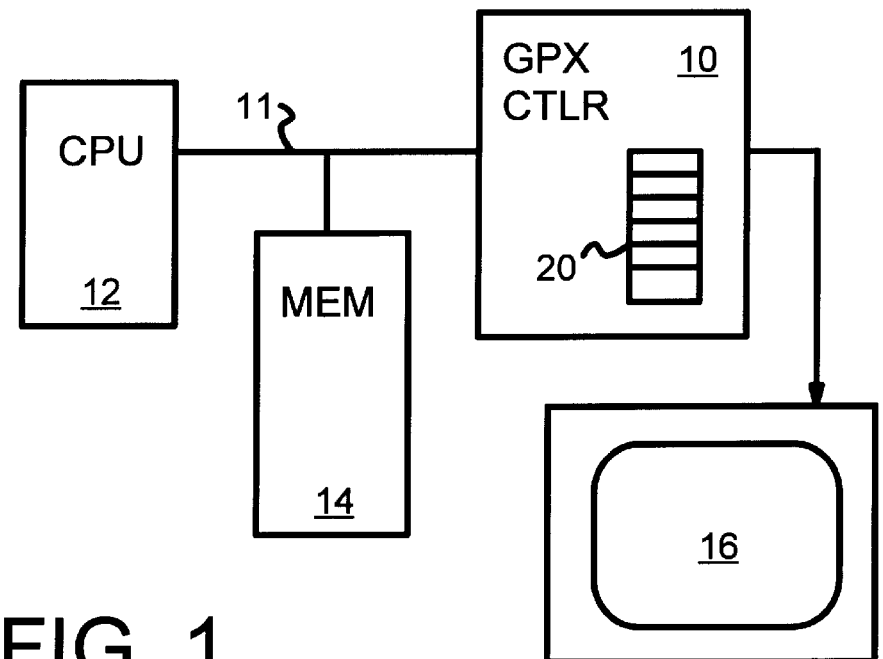
FIG. 1 shows a computer system with a controller chip having indexed registers.
Figure 2:
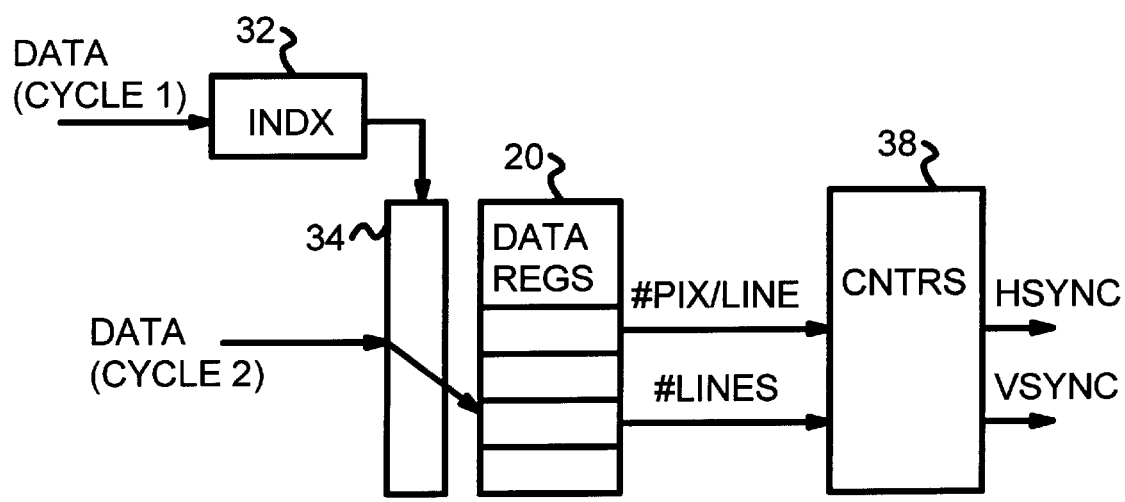
FIG. 2 highlights an index register that selects a data register for access.
Figure 3:
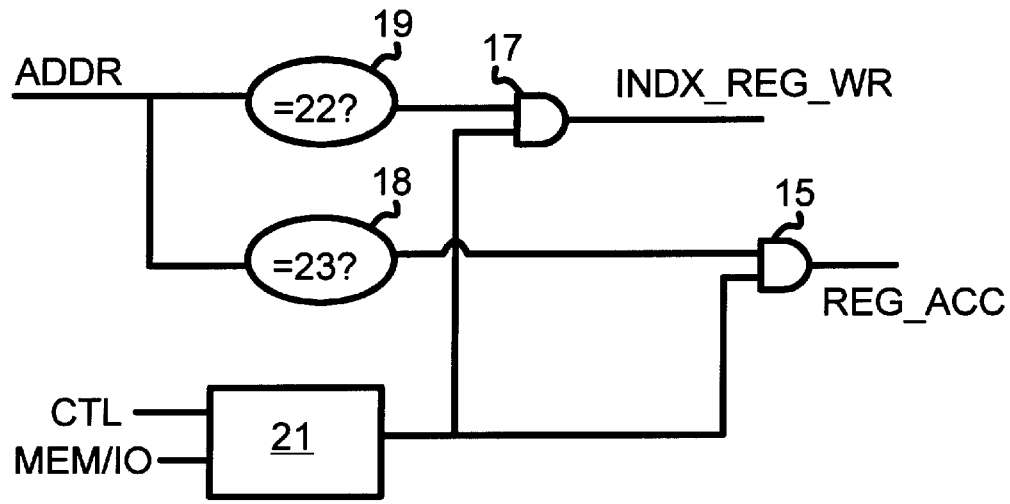
FIG. 3 shows an index-register decoder in a controller chip.
Figure 4:
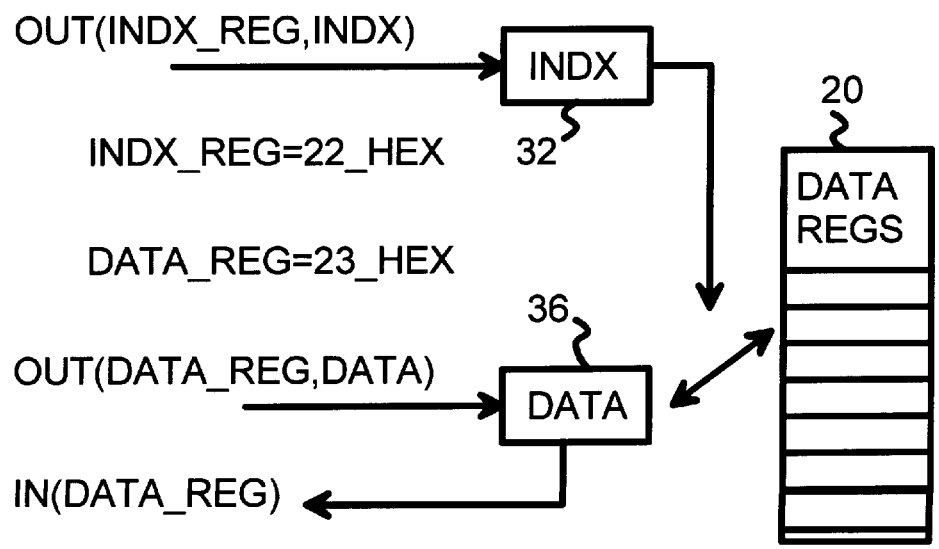
FIG. 4 illustrates in an abstract way how an index register and a data register are used to access indexed registers.
Figure 5:
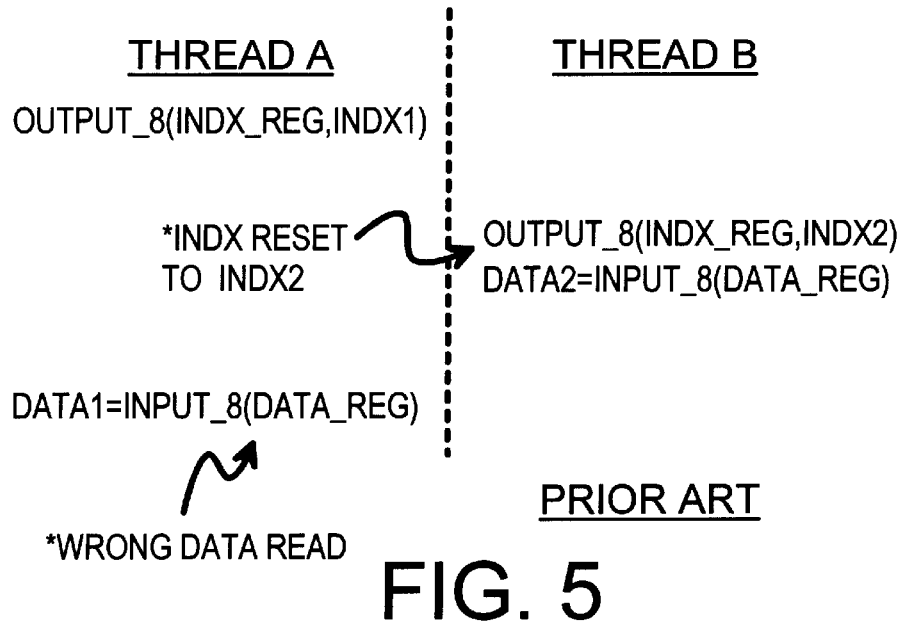
FIG. 5 highlights the problem of index overwriting by multiple threads.
Figure 6:
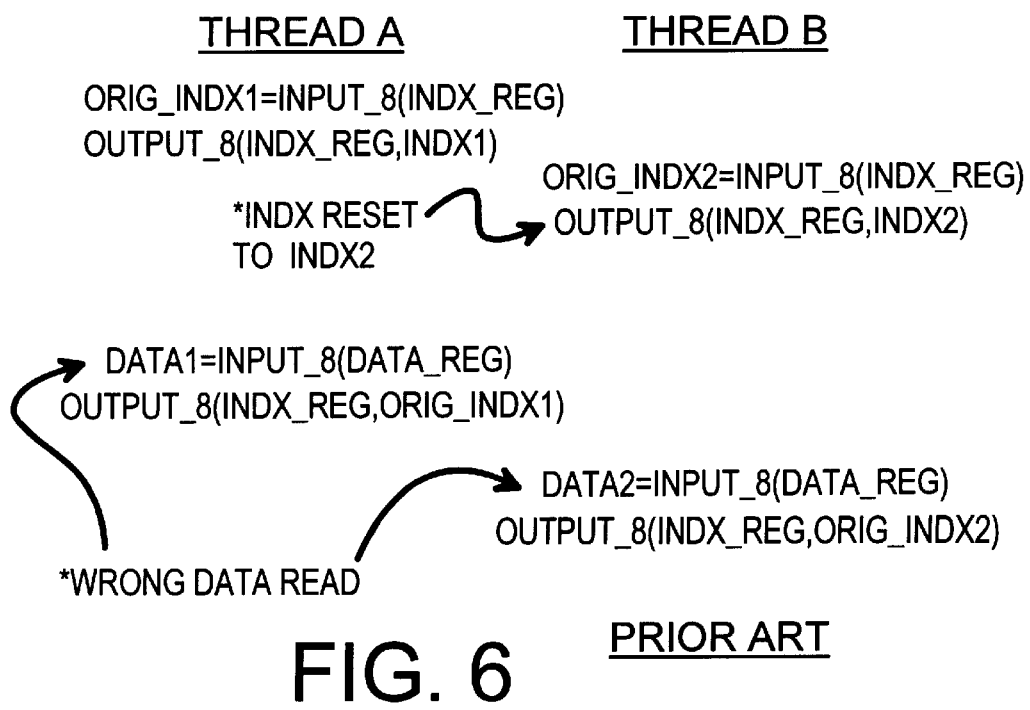
FIG. 6 highlights the failure of a common solution for multi-threaded register reading.

The present invention relates to an improvement in index-register accessing. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventor has devised a closed-loop system that provides feedback to the software or firmware routine that writes the indexed registers. This feedback allows the software to determine when another thread has changed the index. When the changed index is detected, the software can retry the indexed-register write until successful.

The invention operates for reads as well as writes, unlike simply using a 16-bit write. The invention is particularly well-suited for reading indexed registers.

8-Bit Write Followed By 16-Bit Read—FIG. 7

FIG. 7 highlights that an 8-bit write instruction sets the index, while a 16-bit read instruction simultaneously reads both the data and the index. The 8-bit write instruction:

output_8(indx_reg, indx1)

sends out indx_reg as the address and indx1 as the data. Only one byte is written, even when the data bus is four or eight bytes wide. The index register is thus set to the value indx1.

The second instruction is a 16-bit read operation:

input_16(indx_reg)

reads two bytes at the address of the index register, indx_reg. Since the address of the data register is indx_reg+1, the data register is read as the next byte above the index register. A two-byte read at the index register's address thus reads both the index register and the data register.

FIG. 8 shows the format of the data read by the 16-bit read instruction that reads both the index and the data together. The address read is indx_reg, the address of the index register. However, the index register is only 8-bits wide. When a 16-bit read is performed, the next 8 bits are also read. These next 8 bits are from the data register, since the data register sits just above the index register at the next sequential address.

Thus the 16-bit read contains the index from the index register at bits 0 to 7, while the data from the data register is contained at bits 8 to 15. As an example, when the index register is at port 22 (I/O address 22 hex, or 00100010 binary), then the data register is the next port, I/O port or address 23 hex.

16-Bit Read Detects Multi-Threaded Index Conflict—FIG. 9

FIG. 9 illustrates that the 16-bit read can detect when multiple threads overwrite the same index. Thread A first writes the index register with an 8-bit write instruction:

output_8(indx_reg, indx1)

This outputs one byte from the CPU to the controller chip, which sets the index register to the value indx1.

Before thread A can write to the data register, thread A is interrupted by the operating system, which allows thread B to continue execution. Alternately, both threads can be running without interruption, but a bus arbiter grants thread B access to the I/O bus rather than thread A after thread A performs the index-register write.

Thread B first writes a different index, indx2, to the same index register, using the instruction:

output_8(indx_reg, indx2)

Then thread B reads the data register pointed to by index indx2 using the 8-bit read instruction:

input_8(data_reg)

Thread B could also perform an 8 or 16-bit write or a 16-bit read as its second instruction, with the same effect on thread A. Additional instructions could be performed by thread B.

If thread B were to restore thread A's index, then thread A would operate correctly. Unfortunately, there is no guarantee that arbitrary software in thread B will perform the save and restore. In the worst case, thread B leaves its index, indx2, in the index register and does not inform thread A that its index has been overwritten.

When thread A resumes execution, it performs a 16-bit read rather than just an 8-bit read. The 16-bit read instruction:

input_16(indx_reg)

reads both the index register and the data register at the same time. The index is sent over the lower byte of the data bus from the controller chip to the CPU, while the data from the controller's data register is sent back to the CPU over the upper ($2^{nd}$) byte of the data bus.

The 16-bit read instruction can be encapsulated within an assignment instruction that stores the 16-bit value as the variable indxdata1:

indxdata1=input_16(indx_reg)

The variable indxdata1 can be examined by thread A's software and the index extracted from the lower 8 bits of variable indxdata1. The extracted index can then be compared to the index written by thread A, indx1. When indx1 does not match the index extracted from variable indxdata1, then the index has been changed. Thread A then discards the data and repeats the indexed register operation by again writing the desired index, indx1, to the index register.

Index Write Repeated When Index Mismatch Detected by 16-Bit Read

FIG. 10 shows a code segment that repeats an 8-bit index write when a 16-bit data read detects an index mismatch. A loop such as a do-while loop can be used to repeat the indexed-register read until the correct index is read back. The instruction output_8(indx_reg, indx)

writes the desired index "indx" to the index register, while the following instruction indxdata=input_16(indx_reg)

reads both the data register and the index register and stores them in the variable indxdata.

It is possible that these two instructions are not executed together, such as when another thread gains access to the I/O bus or interrupts the current thread between execution of the two instructions. While most such interruptions do not access the same index registers and thus do not interfere with the indexed-register access, other threads that over-write the index register are detected by the while instruction:

while ((indxdata & 0x00FF)!=indx)

This instruction causes the do loop to be repeated while the tested expression is true. Each time the while instruction is executed, it determines if the indexes mismatch (are not equal, !=). When the indexes mismatch, the expression (indxdata & 0x00FF)!=indx is true, and the do loop and its 8-bit index write and 16-bit read are repeated.

The read-back index is extracted from the variable indxdata, which contains the index in the lower 8 bits, but the data in the upper 8 bits. Extraction is performed by a bit-wise AND operation:

indxdata & 0x00FF

This AND operation ANDs the upper 8 bits (from the data register) with zero ("00" hex), which always results in zeros for the upper 8 bits. The lower 8 bits (from the index register) are ANDed with ones ("FF" hex), which results in a one when a bit from the index register is a one, but a zero when the index-register bit is zero. Thus the index in the lower 8 bits is passed through without change, but the upper 8 bits from the data register are blocked. The original index indx can be zero-extended to 16 bits and compared with the 16-bit result of the AND operation, which also has zeros in its upper 8 bits. The compare operation!= can be a bit-wise compare, or an arithmetic compare (either greater than or less than, perhaps executed by subtraction and comparison of the difference to zero).

Figure 11A:
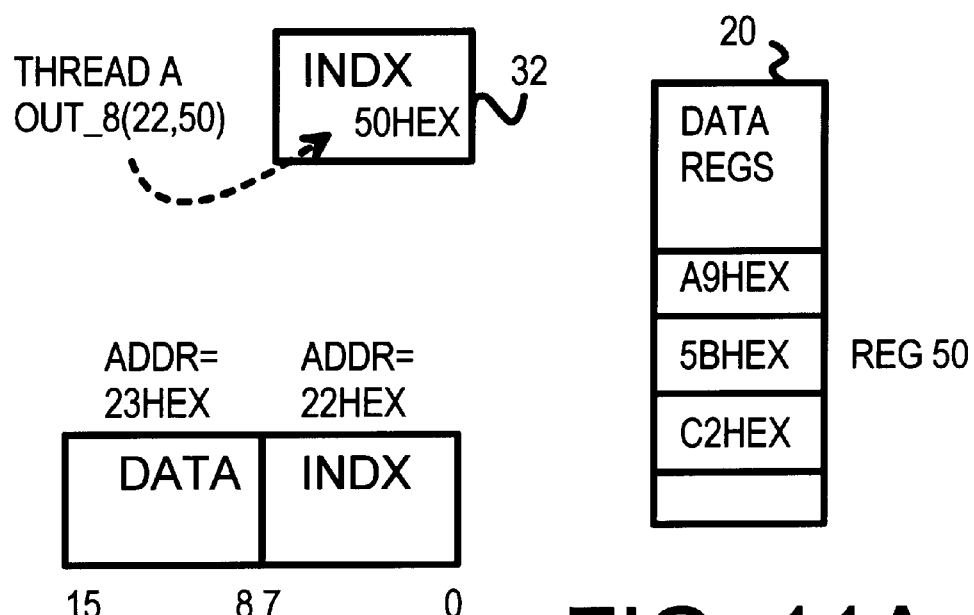
FIGS. 11A, 11B illustrate operation of a single thread using the 8-bit index write and the 16-bit index and data read.
Figure 11B:
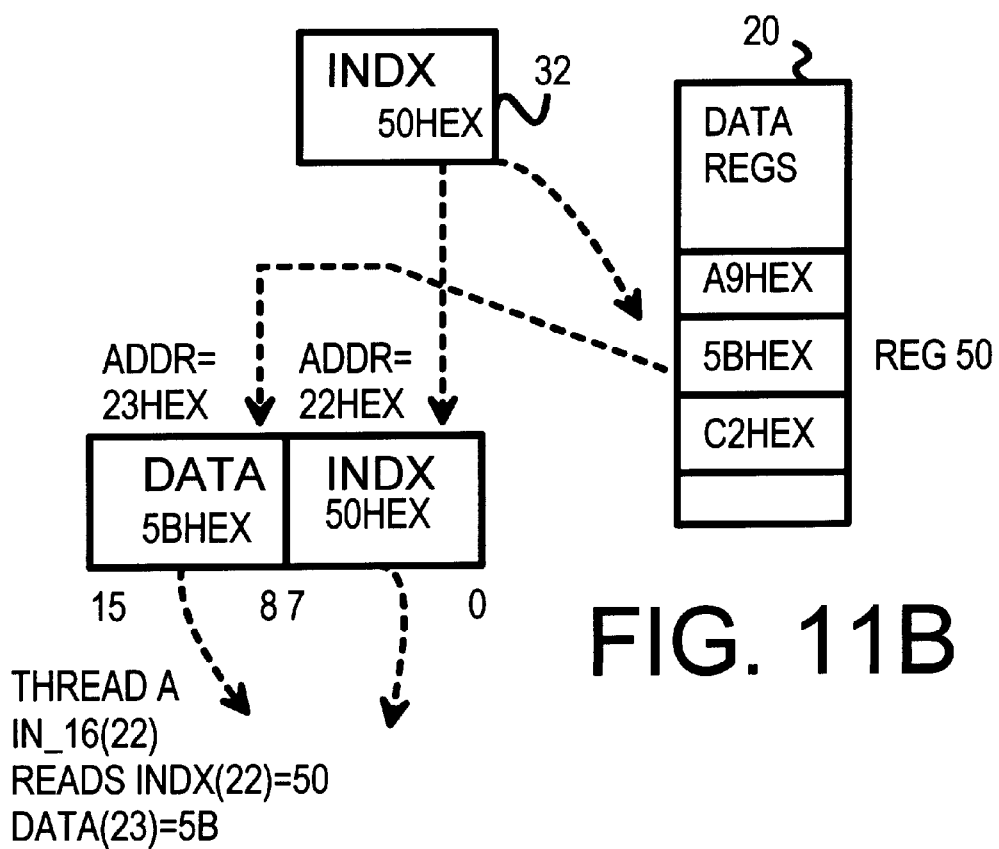

Example of Operation—FIGS. 11A, 11B

FIGS. 11A, 11B illustrate operation of a single thread using the 8-bit index write and the 16-bit index and data read. In these examples, the index register is port 22, while the data register is port 23 hex.

In FIG. 11A, thread A performs the 8-bit write:

output_8(indx_reg, indx1), which is the same as output_8(22, 50)

where the index register is port 22 and the desired index inxd1 is 50 hex.

The index value 50 hex is written into index register 32 in the controller chip by the CPU executing the instruction. This selects index register 50 hex for access.

In FIG. 11B, the second cycle reads both the selected data register and the index register in a single atomic operation. The value from index register 32, 50 hex, is transferred to the output data bus from the controller chip to the CPU over data bits 7:0. The index 50 hex from index register 32 selects index register 50 in indexed registers 20. Since the instruction is a read, the value stored in index register 50 hex is transferred to the data bus for output. This value is 5B hex, and occupies data bits 15:8 of the data bus. This is the upper byte for a 16-bit data bus, or the second of four bytes of a 32-bit data bus.

Thread A executing on the CPU reads the 16 data-bus lines as a variable. Bits 15:8 of the variable are the data-register value, 5B hex, while bits 7:0 are the index value, 50 hex. Thread A compares the index read and extracted from the variable, 50 hex, with the original index written in FIG. 11A. Since they match, the data read out, 5B hex, is the data from the desired index register 50. Thread A's software is thus guaranteed that the data was read from the correct index register.

Multi-Threaded Overwrite Detected—FIGS. 12A–D

FIGS. 12A–D show an example of conflicting multi-threaded indexed-register accesses that are detected by the invention. This roughly follows the sequence of instructions shown in FIG. 9, but uses a 16-bit read for both threads. In FIG. 12A, thread A again writes the desired index, 50 hex, to index register 32. This selects index register 50 hex in indexed registers 20 for access.

Figure 12A:
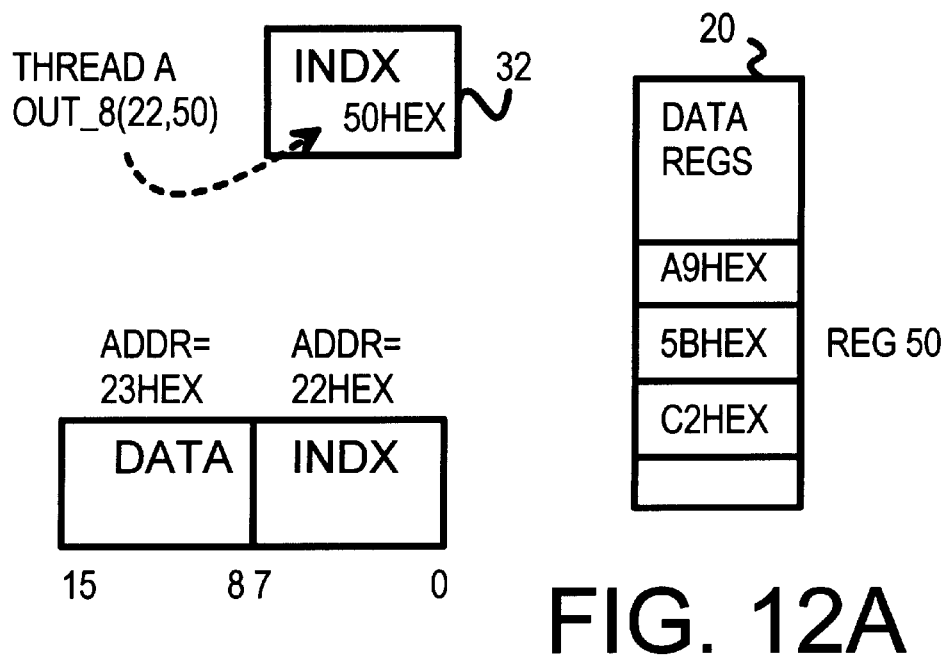
FIGS. 12A–D show an example of conflicting multi-threaded indexed-register accesses that are detected by the invention.
Figure 12B:
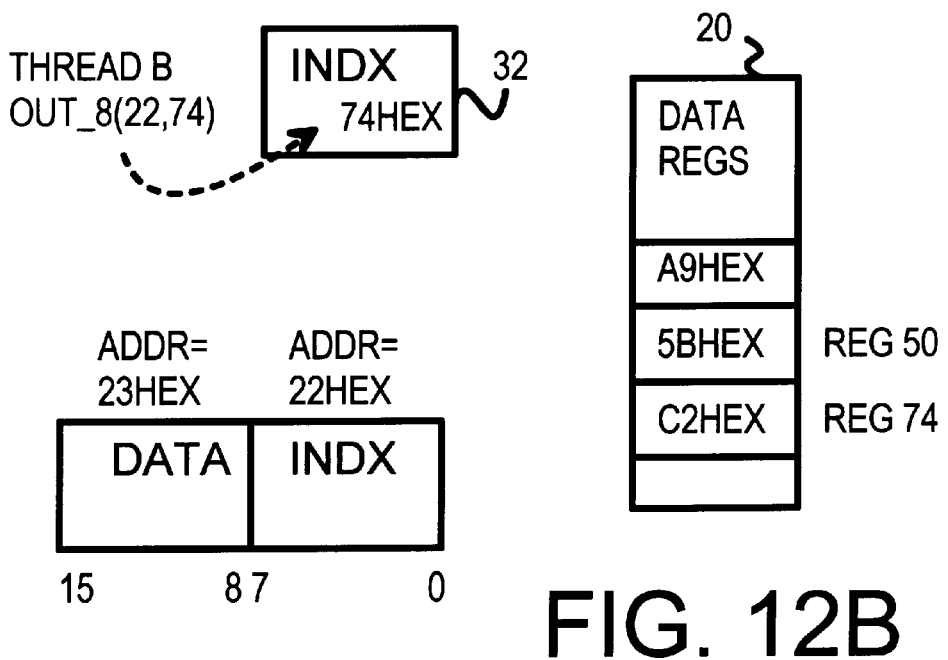

In FIG. 12B, thread B gains access to the I/O bus and thread B writes a different index to index register 32 using the instruction:

output_8(22, 74)

Thread B's index of 74 hex over-writes thread A's index of 50 hex. Index register 32 selects index register 74 rather than index register 50.

Figure 12C:
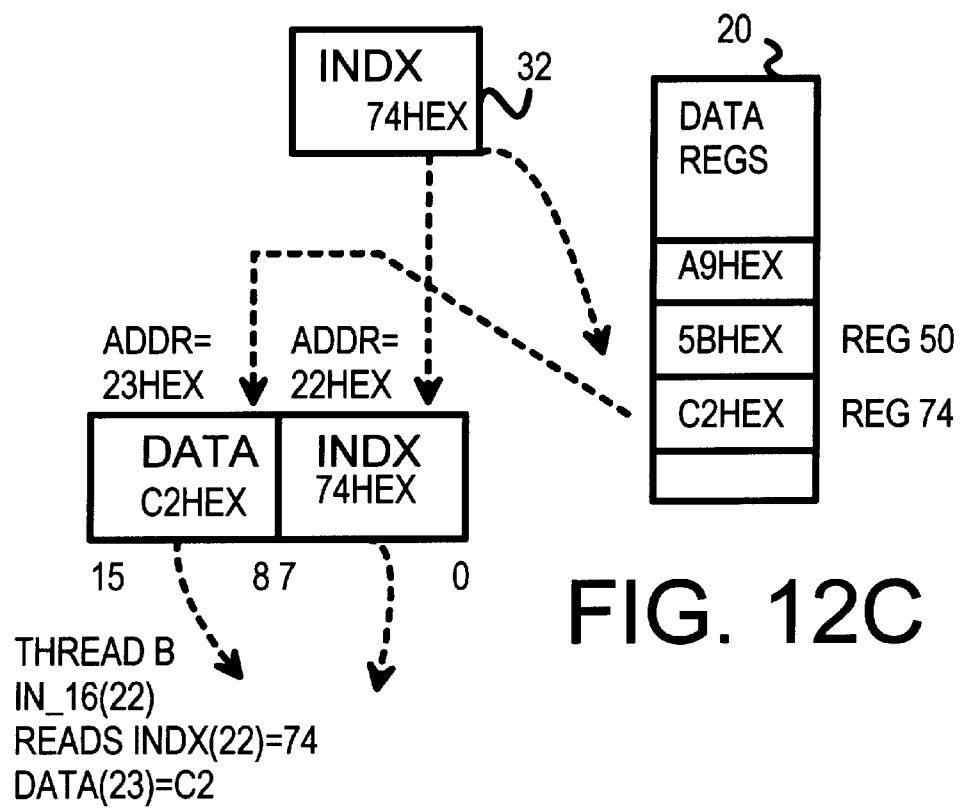

In FIG. 12C, thread B performs a 16-bit read from the index register using the instruction:

input_16(22)

The index from index register 32, 74 hex, is output to the CPU on data lines 7:0, while the selected data register, index 74 hex, has its contents output on data lines 15:8. The selected data register, index 74, stores the data C2 hex. Thus the 16-bit output is C274 hex. This is the correct index and data for thread B.

Figure 12D:
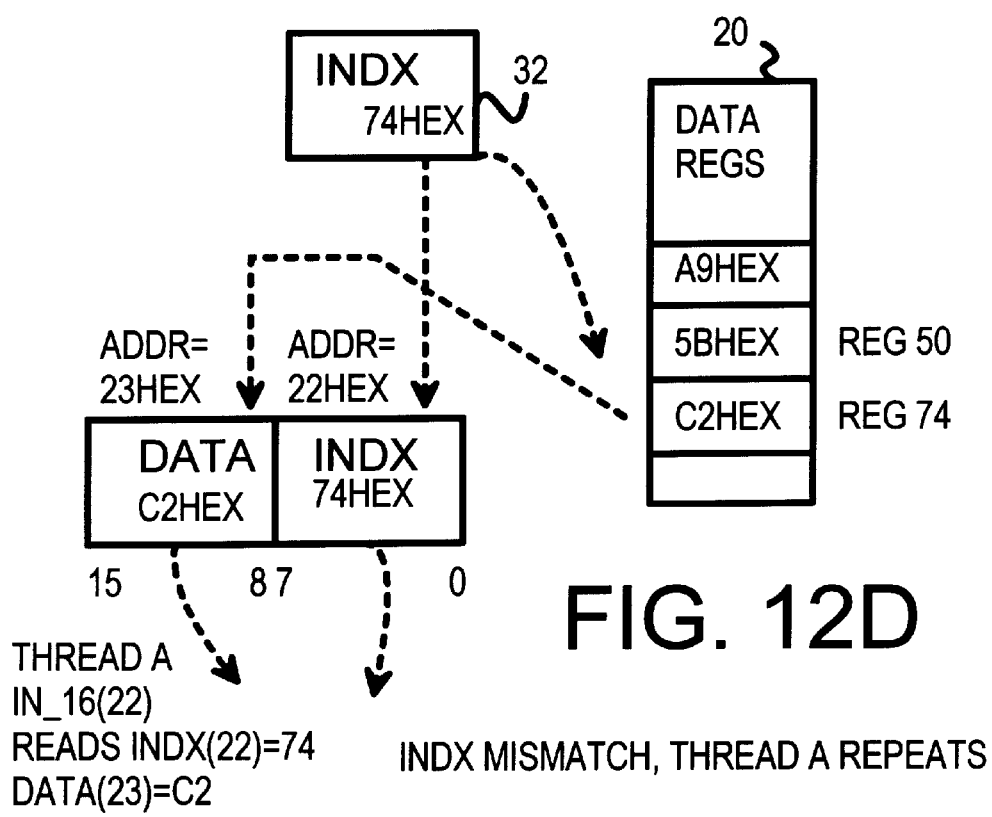

In FIG. 12D, thread A has regained control of the I/O data bus and performs its second instruction:

input_16(22)

Since the index from thread B remains in index register 32, the same value is output to thread A, value C274 hex. The index from index register 32, 74 hex, is output to the CPU on data lines 7:0, while the selected data register, index 74 hex, has its contents output on data lines 15:8. The selected data register, index 74, stores the data C2 hex.

Although the wrong data (C2 hex, not 5B hex) is read, thread A is able to detect the error by comparing the indexes. The index read in FIG. 12B and extracted from the 16-bit read is 74 hex. This extracted index is compared to the desired index written in FIG. 12A, 50 hex. Since 50 does not match the extracted index 74, the software determines that the wrong indexed register was read. Thread A then repeats the index-register write and read operations shown in FIGS. 11A, 11B.

ADVANTAGES OF THE INVENTION

The invention provides a feedback mechanism for software to determine if the desired index register was read. Reading both the index and the data registers together as an atomic operation ensures that the data read belongs to the index read back with the data. The software can easily compare this index to the desired index to see if the index has changed. No communication among thread is necessary when accessing shared index registers.

Very little overhead is added. In particular, no additional I/O cycles are required when the correct index is read. The overhead for the extract and compare operations is minimal, since these can be executed within the CPU at the higher CPU clock rate without accessing the external memory or I/O bus. I/O cycles are only added when the wrong index is detected, when the index registers must be re-accessed. The invention is more efficient than storing and restoring the index, since additional I/O cycles to restore the index are not necessary. The savings is significant since the I/O cycles are lengthy, especially compared with fast CPU clocks.

While index register accesses are rare, it is possible to have conflicts such as discussed herein. These conflicts are detected by the invention and access repeated until the correct index is read. A double-access deadlock is possible where both threads access the same index and neither is able to read the desired index. This deadlock is even less likely than index conflicts as it depends on the exact timing of both threads.

The invention's method to read and write index registers is immune to multi-tasking interruption. Multiple threads can simultaneously read and write indexed registers without notifying each other. Threads can read and write indexed registers in a manner that is completely asynchronous to each other. Multi-tasking index-register access does not unnecessarily add slow index-register read and write operations. Higher-performance index-register accessing for multi-tasking is achieved.

ALTERNATE EMBODIMENTS

Several other embodiments are contemplated by the inventor. For example, different register and addressing sizes can be used. The smallest addressable unit has been described as a byte, but some systems may address only 16-bit, 32-bit, or 64-bit words as the smallest write-able unit. The index register may be 32 bits, while the data register also 32 bits. A 64-bit read can then be used to read both the index and the data registers. Sixteen-bit indexed registers are also possible.

The index register does not have to be the same width as the data registers. For example, an 8-bit index register can be used with 16-bit data registers. In that case, a 3-byte or 4-byte read is performed of both the index and data registers.

Many different I/O addresses can be used for an index and a data register. While I/O ports 22 and 23 hex have been used in the examples, color graphics chips use 3B4 (hex) for the index register and 3B5 for the data register. Often several sets of indexed register are used. In addition to 3B4/3B5 for VGA index registers, the same graphics chip can use ports 3CE, 3CF for graphics-extension indexed registers.

The invention requires that the controller chip can perform 16-bit reads, arranging the data register on the upper byte and the index register on the lower byte of a 16-bit read. Some controller chips may not have this capability, and might not be able to read both the index and data registers at the same time.

The invention could be applied to memory-mapped I/O, where the index and data registers are mapped in the address rather than the I/O space. The invention can also be applied to self-updating index registers where the index is automatically incremented or decremented.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A method for reading indexed registers comprising:
   executing a single-width write instruction in a processor;
   writing a desired index value to an index register in a controller chip when the single-width write instruction is executed, the desired index value having a single width of bits;
   executing a multiple-width read instruction in the processor;
   reading from the controller chip when the multiple-width read instruction is executed:
   1) a stored index from the index register and
   2) selected data from a selected data register;
   wherein the selected data register is identified by the stored index from the index register;
   comparing the stored index to the desired index value; and
   re-executing the single-width write instruction and the multiple-width read instruction when the stored index does not match the desired index value,
   whereby the stored index is read with the selected data from the selected data register that is selected by the stored index to determine when to re-execute reading the indexed registers.

2. The method of claim 1 further comprising:
   executing a second program in a second thread;
   the second thread over-writing a second index to the index register after the single-width write instruction is executed by a first thread, but before the multiple-width read instruction is executed by the first thread;
   wherein the first thread reads the second index that mis-matches the desired index value when the second thread over-writes the index register,
   whereby the second thread over-writing the index register is detected by the first thread comparing the stored index to the desired index value.

3. The method of claim 1 wherein the selected data register has the single-width of bits.

4. The method of claim 1 further comprising:
   decoding the stored index from the index register;
   selecting one of a plurality of data registers as the selected data register using the stored index,
   whereby the stored index selects from among the plurality of data registers.

5. The method of claim 1 wherein the multiple-width read instruction is an atomic instruction performing a single read operation that simultaneously fetches at least two single-width values in a single access cycle.

6. The method of claim 1 wherein the single-width write instruction and the multiple-width read instruction both output an address of the index register to an address bus connecting the processor and the controller chip.

7. The method of claim 6 wherein the selected data register has an address that is a next address to the index register,
   whereby the selected data register and the index register have sequential addresses.

8. The method of claim 7 wherein the selected data register and the index register are input/output ports.

9. The method of claim 7 further comprising:
   transferring the stored index over a first single-width segment of a data bus connecting the controller chip to the processor when the multiple-width read instruction is executed;
   transferring the selected data over a second single-width segment of the data bus connecting the controller chip to the processor when the multiple-width read instruction is executed.

10. The method of claim 9 wherein the single-width is 8 bits and wherein the multiple-width is 16 bits,
    whereby selected data register and the index register are byte-wide registers.

11. The method of claim 9 further comprising:
    storing a multiple-width variable from the data bus when the multiple-width read instruction is executed, the multiple-width variable including the stored index and the selected data;
    extracting the stored index from the multiple-width variable to generate an extracted index; and
    comparing the extracted index to the desired index value,
    whereby the stored index is extracted from the multiple-width variable.

12. The method of claim 11 wherein extracting the stored index from the multiple-width variable comprises:
    bit-wise ANDing ones with the first single-width segment of the multiple-width variable that contains the stored index;
    bit-wise ANDing zeros with the second single-width segment of the multiple-width variable that contains the selected data.

13. A configurable computer system comprising:
    a central processing unit (CPU) for executing instructions;
    a controller chip having an index register and a plurality of data registers, the index register selecting, as a selected data register, one of the plurality of data registers for access;
    a bus connecting the CPU with the controller chip;
    a first program executing on the CPU, the first program including:
    first means for writing a desired index to the index register;
    second means for reading a stored index from the index register while simultaneously reading the selected data register in the plurality of data registers;
    compare means for comparing the desired index to the stored index; and
    repeat means, coupled to the compare means, for repeating actions of the first means and the second means when the compare means determines that the desired index does not match the stored index;
    whereby the first program detects when the wrong data is read by simultaneously reading the index register and the data register from the controller chip.

14. The configurable computer system of claim 13 further comprising:
    a second program executing on a second thread on the CPU, for writing a second index to the index register while the first program is accessing the controller chip, wherein the compare means detects when the second thread over-writes the index register.

15. The configurable computer system of claim 14 wherein the selected data register is uniquely identified by the stored index.

16. The configurable computer system of claim 15 wherein controller chip outputs as a 16-bit read both the index register and the selected data register.

17. The configurable computer system of claim 13 wherein the controller chip is a graphics controller for controlling a display, the plurality of registers including graphics-control registers.

18. A computer-program product comprising:

a computer-usable medium having computer-readable program code means embodied therein for accessing indexed registers in a multi-threaded environment, the computer-readable program code means in the computer-program product comprising:

execution means for executing a single-width write instruction in a processor;

index-write means for writing a desired index value to an index register in a controller chip when the single-width write instruction is executed, the desired index value having the single width of bits;

second execution means for executing a double-width read instruction in the processor;

double-width means for reading from the controller chip when the double-width read instruction is executed:
  1) a stored index from the index register and
  2) selected data from a selected data register;

wherein the selected data register is identified by the stored index from the index register;

compare means for comparing the stored index to the desired index value; and repeat means for re-executing the single-width write instruction and the double-width read instruction when the stored index does not match the desired index value, whereby the stored index is read with the selected data from the selected data register that is selected by the stored index to determine when to re-execute reading the indexed registers.

19. The computer-program product of claim 18 further comprising:

second-thread means for executing a second program in a second thread;

the second thread including means for over-writing a second index to the index register after the single-width write instruction is executed by a first thread, but before the double-width read instruction is executed by the first thread;

wherein the first thread reads the second index that mis-matches the desired index value when the second thread over-writes the index register, whereby the second thread over-writing the index register is detected by the first thread comparing the stored index to the desired index value.

20. The computer-program product of claim 19 wherein the second-thread means is operating on a second central processing unit CPU, wherein the controller chip is accessed through a shared I/O bus.

* * * * *